Figure 1:
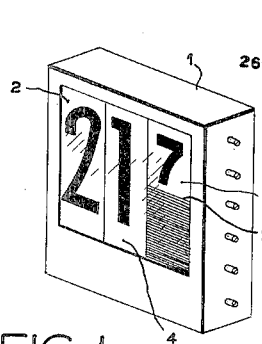

Aug. 7, 1956     W. N. LURCOTT ET AL     2,757,466
ADJUSTABLE PRICE INDICATORS
Filed June 28, 1952

INVENTORS
WINFRED N. LURCOTT
NORMAN O. MORTON
BY Ralph N. Bumstead
ATTORNEY

United States Patent Office 2,757,466
Patented Aug. 7, 1956

2,757,466

ADJUSTABLE PRICE INDICATORS

Winfred N. Lurcott, Elizabeth, and Norman O. Morton, Mountainside, N. J.

Application June 28, 1952, Serial No. 296,146

8 Claims. (Cl. 40—86)

This invention relates to adjustable price indicators and more particularly to improvements in the structure and convenience of operation of indicators such as are used, for example, in price signs mounted on gasoline pumps. The improvements, however, are believed to have a wider application than as though they were related solely to indicators of that type.

It is common practice to employ price indicators on gasoline pumps wherein a card or cards showing the current price are inserted in some sort of a holder. Price changes are variable from time to time at any particular station and involve the maintenance of a considerably large file of price cards if such cards are used.

Accordingly it is an object of our invention to provide a price indicator of the type wherein the price to be displayed is shown on a plurality of numeral bearing tapes which can be wound from and onto two winding drums reciprocally to change the numerical indication either upwardly or downwardly.

Another object is to provide a price indicator in which independent adjustments of the numerals in different denominational orders of a multi-digit price may be made.

Still another object is to provide a reciprocally operating winding means for digital tapes so arranged that a certain spindle in said means may be turned to change the numerical display on both sides of the indicator from one and the same value to a chosen higher value that will be alike on both sides of the indicator. While this object is carried out it is a feature of our invention to provide a companionate spindle for the spindle that is driven, the companionate spindle acting to pay out the tape under a tension which is maintained by friction in its bearings.

Complementary to the object last stated, it is an object to provide means for at times using said companionate spindle as a winding spindle so as to move the tape in the proper direction for changing the numerical display to a lower value.

Again it is an object to provide a common control for adjustment of the digital price indications on two sides of the price indicator, this control being capable of exercise upon different digital tapes of the same denominational order simultaneously, and independently of the tapes which relate to other denominational orders.

Once more, it is an object to provide a price indicator wherein the mechanical features of its general structure, the design of its components, and the methods used in their assembly, all lend themselves to low cost manufacturing procedure and at the same time contribute toward attractiveness of the invention as an article of manufacture.

In order to achieve the above stated objects and others which will become apparent in the ensuing description we have devised a price indicator the housing for which may be considered more or less conventional, but the internal structure of which is believed to be quite novel. The housing has windows on opposite sides. There are in the preferred embodiment of the invention six tapes each of which may be wound back and forth to display different numerals through the windows of the housing. The numerals on each tape represent digits of a single denominational order. There are two tapes for each order so that like digits may be displayed on opposite sides of the housing and through the windows thereof. There are six spindles, each carrying one or two winding drums which serve to wind the tapes up and down. The tapes for the units digits are wound two-ply on single drums carried by two of the spindles. The other spindles have two drums each. One pair of spindles is used in connection with the two tens-tapes; the other in connection with tapes the digits on which may represent tenths of a cent or other fractions. These tapes must, of course appear on the right hand side of each window and cannot, therefore be wound on the same drums, although they are controlled by the same spindles. The same is true, also, of the tapes for digits of the tens denomination.

Proceeding now with a more detailed description, we refer to the accompanying drawing wherein—

Figure 2:
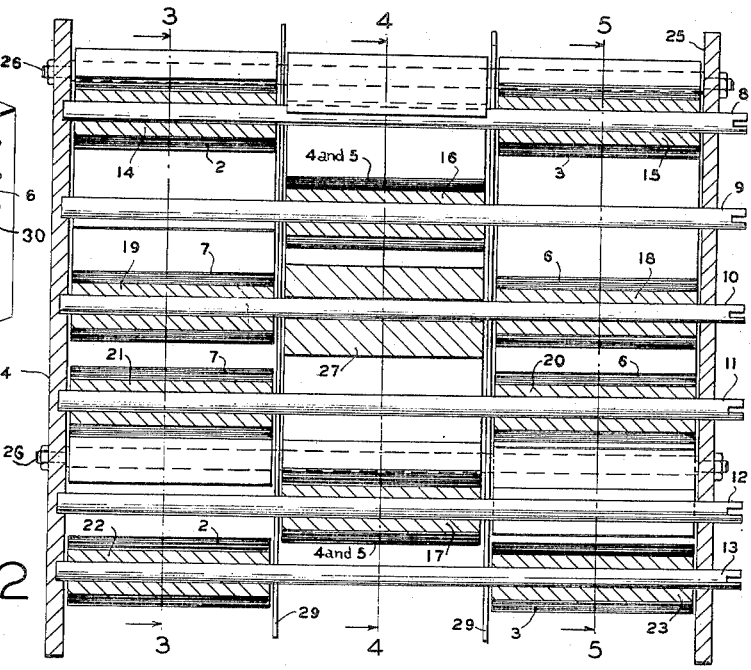
Figure 3:
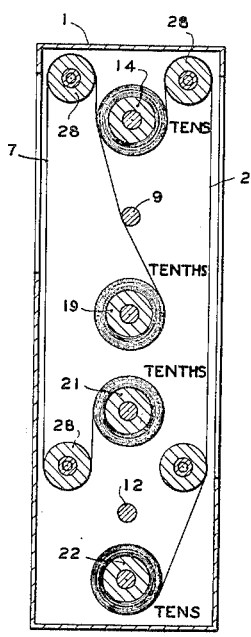
Figure 4:
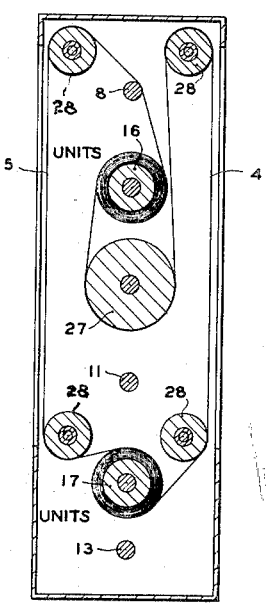
Figure 5:
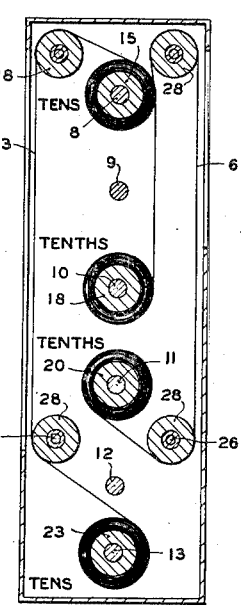

Figure 1 is a perspective view of our improved price indicator; Fig. 2 is a vertical cross-section taken through the plane in which all the spindles lie; and Figs. 3, 4 and 5 are vertical transverse sections taken on different planes in accordance with the section lines shown in Fig. 2, where 3—3 represents the plane of the section shown in Fig. 3, and 4—4 and 5—5 have corresponding significance.

The housing 1, as shown in Fig. 1 may be fabricated in any desired manner, but essentially so as to provide windows on opposite sides. Glass or transparent plastic material may be used in the windows to protect the internal structure from weathering. As viewed in Fig. 1 there are three independently operable tapes which are printed or otherwise inscribed with numerals for displaying respectively a chosen tens digit, a units digit and a decimal. In that order tapes 2, 4 and 6 are shown. Other tapes 3, 5 and 7 would appear from left to right through the opposing window if such a window had been shown in the drawing, but the appearance would correspond exactly with what is shown in Fig. 1.

There are six shafts 8, 9, 10, 11, 12, and 13 which are journaled in end-plates 24 and 25. These shafts have turning means, such as slots in one end of each, whereby they may be independently turned for changing the price display with respect to tens digits, units digits and tenths digits rspectively. Obviously the shafts can be turned with the aid of a screw driver.

Affixed to shaft 8 for turning therewith are two winding drums 14 and 15 on which the tens-digit tapes 2 and 3 are wound respectively. One winding drum 16 is affixed to shaft 9. This drum carries a two-ply winding of the two units-digit tapes, 4 and 5. Tape 4 is also looped around an idler roller 27, the latter being loosely mounted on shaft 10. Shaft 10 has affixed thereto winding drums 18 and 19 on which tapes 6 and 7 for the tenths denomination are respectively wound. It will be apparent that these tapes may bear character representations of fractions other than tenths. Or if the price is expressed in mixed denominations, as in certain forms of foreign currency, then any suitable series of numerals or fractions may be displayed on tapes 6 and 7.

Shaft 11 has fixedly mounted on it two winding drums 20 and 21 which respectively serve to wind up tapes 6 and 7 in the reverse direction in respect to the winding functions of drums 18 and 19. The winding drum 17 is affixed to shaft 12 and serves to wind the units digit tapes 4 and 5 two-ply in the opposite direction with respect to the winding function of drum 16. Two winding drums 22 and 23 are fixedly mounted on shaft 13 for winding the tapes 2 and 3 respectively in the opposite direction with respect to the winding functions of drums 14 and 15.

Four spacing studs 26 are preferably used to hold the end plates 24 and 25 suitably assembled with the operative structure of the indicator. The studs 26 are shouldered and threaded at the ends so as to provide, for example, a conventional means of securing the studs within holes in the end plates. Thus, nuts may be screwed onto the stud ends of this purpose. The studs 26 also serve as spindles for mounting thereon a plurality of idler rollers 28. These rollers are loosely mounted on the studs and since they act like loose pulleys they are readily turned by movement of the tapes which are looped about them for the purpose of training the latter into planes closely adjacent the windows.

The tenths-digit tapes 6 and 7 are considerably shorter than the others, due to the diminished height of the numerals thereon. In order to restrict the display of these numerals to just one at a time through either of the windows two alternative arrangements may be adopted: (a) the window openings in front of the tapes 6 and 7 may be of reduced vertical dimension as shown on the left side of Fig. 3 and the right side of Fig. 5; or (b) the windows may be strictly rectangular as shown in Fig. 1, while masking means 30 are provided between the transparent window panes and the tape areas of tapes 6 and 7 which need to be covered to avoid displaying more than one tenths-digit at the same time. A sheet of cardboard or other material may be used as the masking means. The sheet may also extend beneath the exposing area for the other tapes provided that the vertical dimension of the rectangular window opening is more than sufficient to display the taller numerals. In this case it may be desirable to utilize the cardboard of the masking means for permanently displaying any printed matter such as, for example, to read "All taxes included."

The ends of the tapes are attached to their respective drums in such manner that, whether they are wound onto the upper drums and payed out from the lower drums, or whether they are wound up on the lower drums, the turning of the shafts as by means of a screw-driver is always in the same direction. As shown in the drawing this direction would be counter-clockwise, considering that the sectional views (Figs. 3, 4 and 5) are looked at from the left side of Fig. 2, whereas the screw-driver slots in the shafts are on their remote ends, the right side. In practice we prefer to wind the tapes so that they may be adjusted to display any new price by clockwise rotation of the shafts. If, therefore, the section-lines 3—3 and 5—5 were to be interchanged, and the viewing direction of all sections be indicated by pointing the section-line arrows the other way, then the slotted ends of the shafts would face the viewer and Figs. 3, 4 and 5 would show correctly the preferred clockwise direction of winding the tapes with application of a screw-driver to any of the shafts.

It is also preferable to arrange the numerals on the tapes so that the sequence from 0 to 9 may be read downwardly of the tape length. Thus, by moving the tapes upwardly, as when the upper shafts are driven by hand power, the prices are raised in each denominational order. Frictional resistance to unwinding is at the same time offered by the close fitting of the lower shafts in their bearings. This automatically produces a desired tension on the tapes so that their planes of travel in front of the windows are smooth and closely adjacent the windows themselves. Substantially equivalent tensions are also maintained when the tapes are moved downwardly to lower the price indications in each denominational order. In this case, however, the hand power is applied to the three lower shafts, one at a time, and with the same direction of turning as for driving the upper shafts, but now the unwinding from the upper drums is due to pulling the tapes downward in response to their wind-up on the lower drums.

On each tape it is desirable to print the word "Stop" both above the "0" and below the "9." This word warns the operator, when he has driven the tape in either direction to display the lowest or the highest numeral of the series, not to force the winding any further, lest the tapes be stripped from their end-fastenings on the drums.

The essential nature of our preferred construction, and the mode of operation of the indicator is believed to be fully covered in the foregoing description. It will be understood, however, by those skilled in the art that modifications may be made without departing from the spirit and scope of the invention as claimed.

The function of the idler roller 27 may not be obvious, but it has been found to assist materially in equalizing the tensions on the two tapes 4 and 5, and hence compensating for a tendency of tape 4 to wind up faster than tape 5. If each of these tapes were to be taken up on the same side of winding drum 16, tape 4 would need to be considered as being wound onto drum 16 in overlying relation to tape 5. When, however, the take-up of the two tapes is on opposite sides of the drum there is no apparent difference between the respective rates of feed of each tape onto the drum 16. The take-up points of these tapes onto drum 17 are substantially diametrically opposed due to the manner in which they are carried over the idler spools 28. These refinements of design tend to improve the smoothness of operation when wind-up adjustments are required. Furthermore, any loss of registry agreement between the two tapes on opposite sides of the indicator which might result from a lack of these refinements is avoided.

We have found it to be a worth-while reduction of cost of our price indicators as supplied for mounting on gasoline pumps when we shorten the tapes 2 and 3 for display of tens digits and eliminate the numerals "5" to "9" inclusive. Present economic conditions enable us to do this, although we appreciate that we may have to modify or completely depart from the practice of shortening the tens tapes, particularly if we were to adapt our indicators for uses other than to display gasoline prices, or to enter foreign markets. We may also wish to build price indicators having more than three denominational orders of digits displayable on each side of the indicator. The novel features of our invention may well be retained in making such modifications. For this reason we desire that the claims be given the broadest interpretation which is permitted by their terminology.

We claim:

1. In a three-digit price indicator, a casing having windows through which to display a selected price on opposite sides thereof, six digit-bearing tapes each carrying a series of up to ten numerals, there being a pair of such tapes individual to each of three denominational orders of the price and individual tapes of each pair being exposable through one and the other of the two windows respectively, three pairs of shafts all extending horizontally through three sections of said indicator, the end sections each containing a tape for display of any one of the tens digits and a tape for display of any one of the tenths digits, the center section containing a pair of tapes both of which are adapted to display any one of the units digits, a plurality of drums to which the ends of said tapes are appropriately attached, said drums being affixed to and rotatable with appropriate ones of said shafts, the arrangement being such that any two drums within the same section which are respectively affixed to the two shafts of a given pair serve for on-and-off winding of a given tape, also any two tapes which bear numerals of the same denomination are carried by drums which have common support on a given pair of shafts, and means operable under all conditions of tape winding whereby agreement between the price displays of the tapes through windows on opposite sides of said casing is automatically maintained.

2. The combination according to claim 1 and including shaft-borne idler roller means for training said tapes into planes of travel adjacent said windows and parallel to the frontal planes thereof.

3. The combination according to claim 1 and including an idler roller loosely mounted on a certain one of said shafts alongside of a shaft that jointly controls the units-digit tapes, only one of which tapes is carried around this idler roller.

4. The combination according to claim 1 and including masking means covering portions of the tenths-digit tapes so that, where the numerals displayed by these tapes are of lesser height than those of the other tapes, a display of no more than a single tenths-digit numeral through each window in provided.

5. An adjustable price indicator having in combination a housing in which are oppositely disposed windows, six horizontally disposed rotatable shafts, journal bearings for frictionally holding said shafts, two winding drums affixed to each of four of said shafts, a single winding drum affixed to each of the two remaining shafts, three pairs of numeral-bearing tapes, there being a pair of such tapes for each denominational order of price digits to be displayed, and each pair of tapes being carried by drums which have common support on a single pair of shafts, the ends of said tapes being secured to said drums and the tapes being so arranged as to enable each of them to be wound onto a particular drum carried by a then driven shaft, and to be payed off from a companion drum the turning of which yields to tape tension, and adjusting means operable by applying a turning movement to one shaft of each pair, thereby to cause the same numeral of a given denominational order to be displayed simultaneously by tapes of an appropriate pair through oppositely disposed windows and in left-to-right reading sequence.

6. An adjustable price indicator having in combination a housing in which are oppositely disposed windows, a plurality of paired digit-bearing tapes of which there is a pair for each denominational order of price digits to be displayed, wind-on-pay-out means for carrying said tapes and for drawing them across the viewing areas of said windows, said means comprising a pair of spindles with drums mounted thereon for coaxially winding on or paying out the two tapes of each pair, each spindle pair being reversibly operable in connection with a respective pair of tapes to wind both tapes in the same direction so as to display like numerals through the two windows, means for causing that pair of tapes which bears digits of the highest denominational order to display the same at the extreme left side of each window as viewed from the outside thereof, and means for causing the tape pairs which bear digits of descending denominational orders to display the same through each window in a manner which enables them to be read from left to right.

7. The combination according to claim 6 and including take-up compensating means comprising an idler roller around which is trained one only of said tapes of a particular pair, this pair being wound two-ply on appropriate drums of said wind-on-pay-out-means.

8. A price indicator having a housing with windows on opposite sides thereof and having pairs of numeral-bearing tapes, each tape of a pair being arranged and adapted to display through a respective one of the windows a selected numeral of a particular denominational order, means including two drum-supporting spindles cooperatively associated with each pair of tapes for wind-on-pay-out operation thereof to bring corresponding numerals of the two tapes into display position, one end of each tape of a tape pair being coaxially drum-wound about a single spindle while said tapes are unwound from drums supported by mating spindles of each spindle pair, and tape-movement compensating means for maintaining registry between the numerical displays of the respective tapes of each tape pair.

References Cited in the file of this patent

UNITED STATES PATENTS

| 709,236 | Morgan | Sept. 16, 1902 |
| 1,067,249 | Hutchinson | July 15, 1913 |
| 1,457,378 | Majka | June 5, 1923 |
| 1,797,647 | Gayer | Mar. 24, 1931 |
| 2,163,128 | McGill | June 20, 1939 |